United States Patent

[11] 3,609,670

[72] Inventor Kenneth C. Knowlton
Plainfield, N.J.
[21] Appl. No. 37,486
[22] Filed May 20, 1970
[45] Patented Sept. 28, 1971
[73] Assignee Bell Telephone Laboratories, Inc.
New York, N.Y.
Continuation of application Ser. No. 449,854, Apr. 21, 1965, now abandoned.

[54] PROGRAM CONTROLLED SYSTEM FOR PROCESSING SPATIALLY DISTRIBUTED INFORMATION
3 Claims, 8 Drawing Figs.

[52] U.S. Cl. .......... 340/172.5
[51] Int. Cl. .......... G06f 7/00
[50] Field of Search .......... 340/324.1, 172.5

[56] References Cited
UNITED STATES PATENTS

| | | | |
|---|---|---|---|
| 2,920,312 | 1/1960 | Gordon et al. | 340/172.5 |
| 3,205,344 | 9/1965 | Taylor et al. | 340/324.1 |
| 3,248,705 | 4/1966 | Dammann et al. | 340/172.5 |
| 3,248,725 | 4/1966 | Low et al. | 340/324.1 |
| 3,256,516 | 6/1966 | Melia et al. | 340/172.5 |
| 3,036,773 | 5/1962 | Brown | 340/172.5 |

OTHER REFERENCES
7090; IBM 709- 7090 General Information Manual (322-6508-2) Aug. 1960; pp. 5, 16, 17, 42 and 43
7090; IBM Operators Guide (Form A22-6535) Nov. 1960; pp. 6- 10.

*Primary Examiner*—Paul J. Henon
*Assistant Examiner*—Harvey E. Springborn
*Attorneys*—R. J. Guenther and William L. Keefauver

ABSTRACT: A computer program is disclosed by means of which graphical information can be directly represented in coded form in the internal memory of the computer. Subroutines are provided for testing, changing and writing graphical symbols in coded form in the computer by means of scanners identifying unique plotting points of the internally represented graphical grid.

INVENTOR
K. C. KNOWLTON
BY G. E. Kersey
ATTORNEY

PROGRAM CONTROLLED SYSTEM FOR PROCESSING SPATIALLY DISTRIBUTED INFORMATION

This is a continuation of an application filed Apr. 21, 1965 with Ser. No. 449,854 now abandoned.

This invention relates to the processing of information and more particularly to the processing of spatially distributed information.

The significance of information often depends not only upon its content but also upon its location in space. In the case of a schematic, for example, the constituents of the diagram are distributed over a two-dimensional surface. In the case of a black and white photograph, the information conveyed by the photograph consists of various levels of intensity also distributed over a two-dimensional surface and ranging from black to white.

Under some circumstances, it is desirable to change the pattern of the distributed information. In the case of a schematic diagram, it is often advantageous to alter the positions of the constituents and their interconnections. In the case of pictorial information, it is often advantageous to alter both the composition and intensity of the subject matter.

In still other cases, it is advantageous to generate spatially distributed information from source specifications, generating intermediate results which are altered until a desired end result is achieved.

It is an object of the invention to manipulate spatially distributed information. Another object is to provide for altering the distribution of spatially distributed information. A further object is to generate prescribed spatial patterns from source information.

In accomplishing the foregoing and related objects, the invention considers information as distributed over a grid, with signals representing the content of each grid position stored in a preassigned section of a machine memory. The signals thus stored are manipulated by scanning registers which in the illustrative embodiment, occupy other sections of the machine memory. The scanners are manipulated to simulate movement over the grid to preassigned positions where information interchange takes place among the various scanners and grid positions through the employment, in a prescribed fashion, of various data processing components. In one embodiment of the invention, the interchange is controlled by signals which are stored in still another region of the machine memory. The composite of the various stored control signals with the various machine components constitutes an apparatus configuration by which information can be altered from one prescribed pattern to another.

Other aspects of the invention will become apparent after considering a illustrative embodiment taken in conjunction with the drawings in which.

Figure 1A:
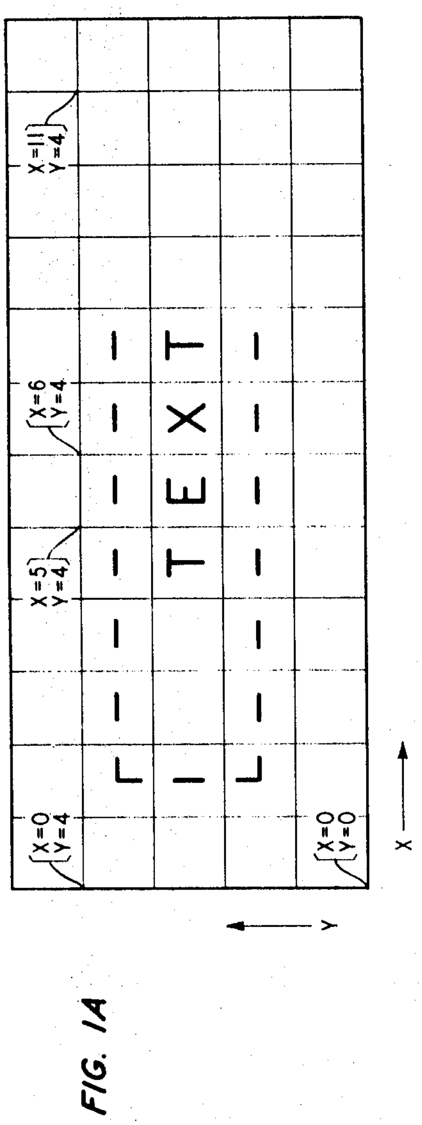
FIG. 1A is a diagram of a display surface containing spatially distributed information.
Figure 1B:
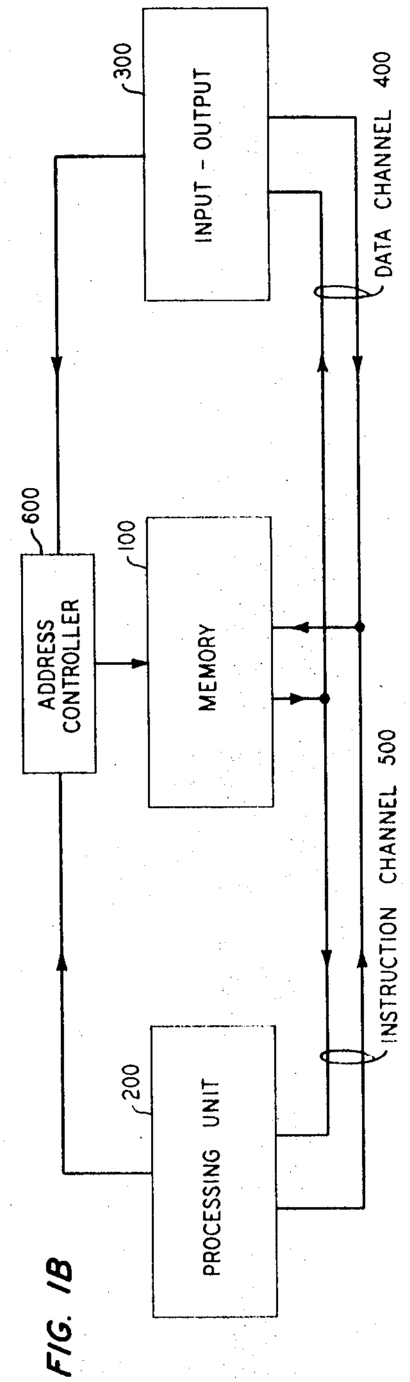
FIG. 1B is a block diagram of a processing apparatus employed in practicing the invention.

Turning to FIG. 1A, the two-dimensional surface pictured there has superimposed upon it a dashed-line boundary which partially encloses the word "TEXT." To illustrate the invention, signals representing the information on the surface of FIG. 1A are processed by apparatus of the kind outlined in FIG. 1B. In the embodiment of the invention under consideration, the spatial distribution of the information pictured in FIG. 1A will be altered to close the lateral gap between the left-hand portion of the dashed-line boundary and the beginning letter of the word "TEXT."

The processing apparatus of FIG. 1B includes a memory 100, a processing unit 200, and an input-output unit 300. Signals representing information enter or leave the memory 100 under the control of an addressing unit 600 from either a data channel 400 of the input-output unit 300 or an instruction channel 500 of the processing unit 200.

As a preliminary to processing, the information pictured on the surface of FIG. 1A is converted into signals. This s done by considering the surface to be a grid of "characters." The characters include the individual letters of the work TEXT, the boundary marks, and the so-called blank character for those regions of the grid which are empty. The various grid regions are designated in the customary fashion employed with rectangular coordinates. For the grid of FIG. 1A there are 12 abscissal units, ranging from X=0 to X=11, and five ordinate units, ranging from Y=0 to Y=4, with the first letter of the word TEXT being at the coordinates X=4 and Y=2.

In one well-known convention for representing characters, such as the so-called "9" code used in the IBM 7090 Data Processing System, a set of six binary signals is used for each character. Under this convention, the blank character is commonly represented by two pulse signals of a first amplitude followed by four pulse signals of a first amplitude followed by four pulse signals of a second amplitude. The resulting set of pulse signals can, in turn, be represented by the binary number 110000, but it is typically more convenient to use octal notation (to the base eight) by which the foregoing signals associated with the blank character are represented by the octal number 60.

Figure 1C:
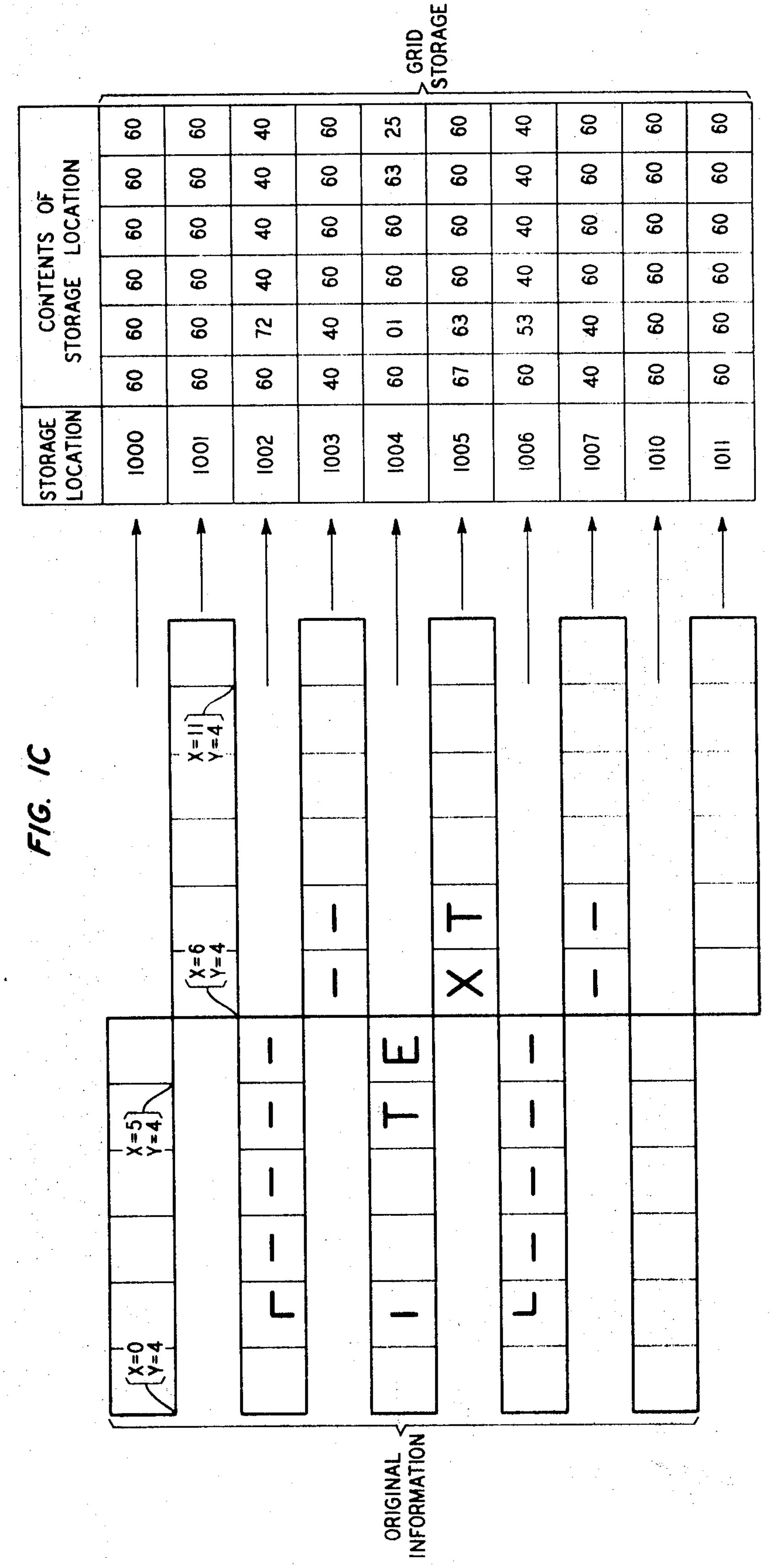
FIG. 1C is a diagram illustrating the storage of signals representing the spatially distributed information of FIG. 1A.

The signals representing the information content of the various grid regions are stored in the memory 100 of FIG. 1B. Assuming that each character of the grid is represented by six binary signals that each storage, i.e., word, location of the memory 100 in FIG. 1B has a capacity of 36 binary signals, one possible storage arrangement is shown in FIG. 1C. Since there are six signals per character, the contents of six squares of the grid occupy each machine word. The portion of the machine memory thus occupied is designated the grid storage. The first word of grid storage, illustratively at memory location 1000, is occupied by grid signals at positions ranging from X=0 through X=5 at the ordinate level Y=4. The contents of the grid regions ranging from X=6 through X=11 at the ordinate level Y=4 occupy the second word location of the grid storage. This storage pattern is repeated for successive rows of the grid until the entire grid storage section is completely occupies by machine signals which, in FIG. 1C, are represented by their octal number designations.

Once the signals representing spatially distributed information are stored, the invention provides for manipulating the signals by using scanner registers which are able to exchange signals with each other and with the grid storage. The scanner registers store, inter alia, signals representing the characters of the grid with which they are associated and the locations of those characters in grid storage. For example, a scanner register, designated as scanner A, which will be discussed in greater detail subsequently, will be assumed to identify that position corresponding in FIG. 1C, with the upper left-hand corner of the dashed-line boundary which partially encloses the work "TEXT." Consequently, this scanner, for the grid storage shown in FIG. 1C, stores signals represented by the octal number 72 and signals designating associated storage location 1002. The register also stores signals indicating that the associated character is the second byte of the machine word at location 1002. It is to be noted that a byte is a subordinate set of signals within a machine word and that for the grid storage of FIG. 1C there are six bytes per machine word. To facilitate the scanner operations it is also advantageous to store the so-called suborigin of the grid storage (storage location after location 1011 of FIG. 1C) and the coordinates X=1 and Y=3 of the stored character. Other desirable items of storage for the scanner are considered subsequently. After the signals of scanner A are established, other scanners can be manipulated with respect to it in order to move the left-hand portion of the boundary in FIG. 1A as desired.

In an illustrative embodiment of the invention, the scanning registers constitute additional storage regions of the machine memory and the interaction between them and the rigid storage takes place under the control of instruction signals which are stored in still other regions of the machine memory.

Figure 2A:
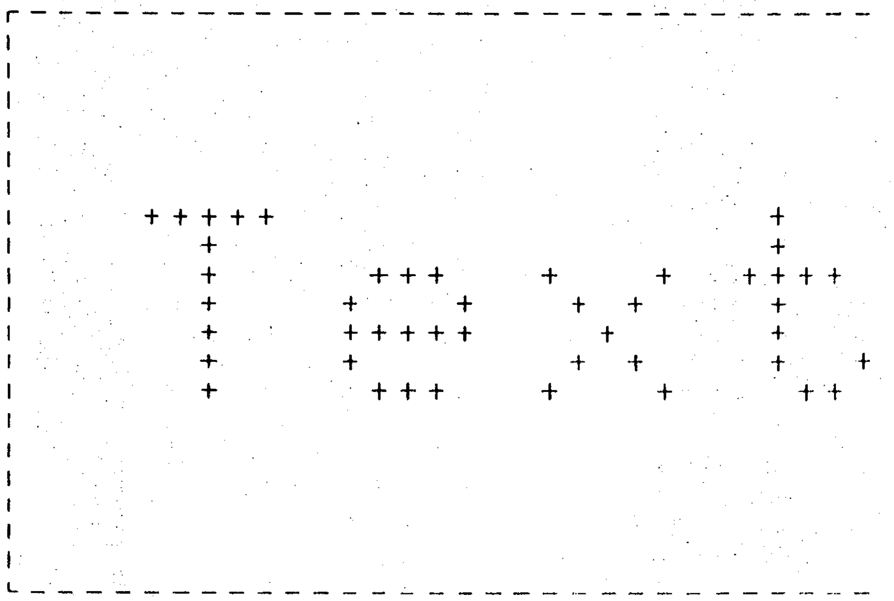
FIG. 2A is a diagram of a display surface with an alternative form of the spatially distributed information of FIG. 1A.

To provide flexibility in the manipulation of spatially distributed information and to reduce the number of different characters required, the spatially distributed information of FIG. 1A is recast as shown in FIG. 2A. The substance of the original information has been retained, but the previous word TEXT now appears with lower case constituents as "TEXT," whose individual characters are derived from a single subordinate character. As a result, eight characters suffice for representing a wide variety of informational situations, for which the contents of each grid region are represented by three binary signals according to table I. Hence each machine word of the memory 100 in FIG. 1B now accommodates binary representations of twelve characters, in accordance with table I.

TABLE I

| Characters | Significance | Octal Representation | Binary Representation |
|---|---|---|---|
| └ | Lower-left corner | 0 | 000 |
| ┘ | Lower-right corner | 1 | 001 |
| ┌ | Upper-left corner | 2 | 010 |
| ┐ | Upper-right corner | 3 | 011 |
| — | Horizontal bound | 4 | 100 |
| \| | Vertical bound | 5 | 101 |
| + | Intersection | 6 | 110 |
| | Blank | 7 | 111 |

Figure 2B:
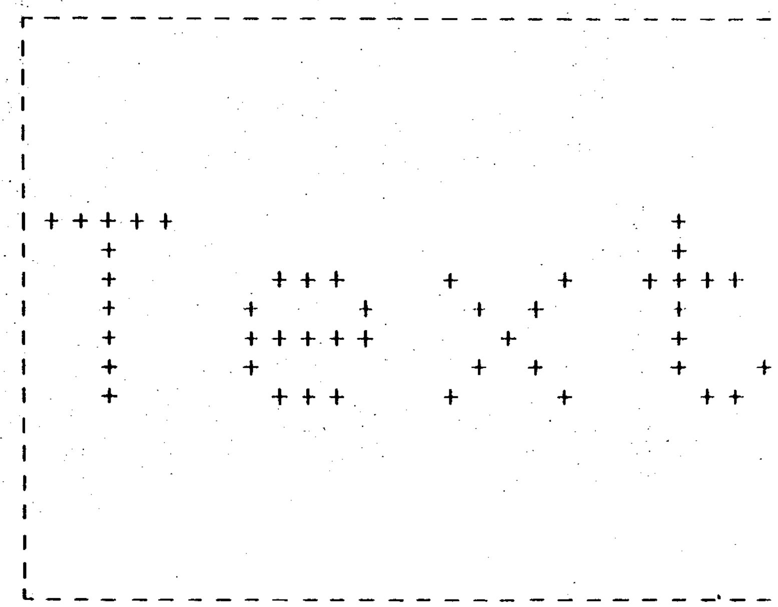
FIG. 2B is a diagram of the surface of FIG. 2A as modified by the practice of the invention.

When the lateral gap between the left-hand portion of the dashed-line boundary in FIG. 2A and the beginning letter of the word "TEXT" is closed in accordance with the invention, the result is as shown in FIG. 2B. This result is accomplished by the interaction between signals representing program steps stored in the memory 100 of FIG. 1B and the hardware components of the overall processing apparatus in FIG. 1B.

Figure 3A:
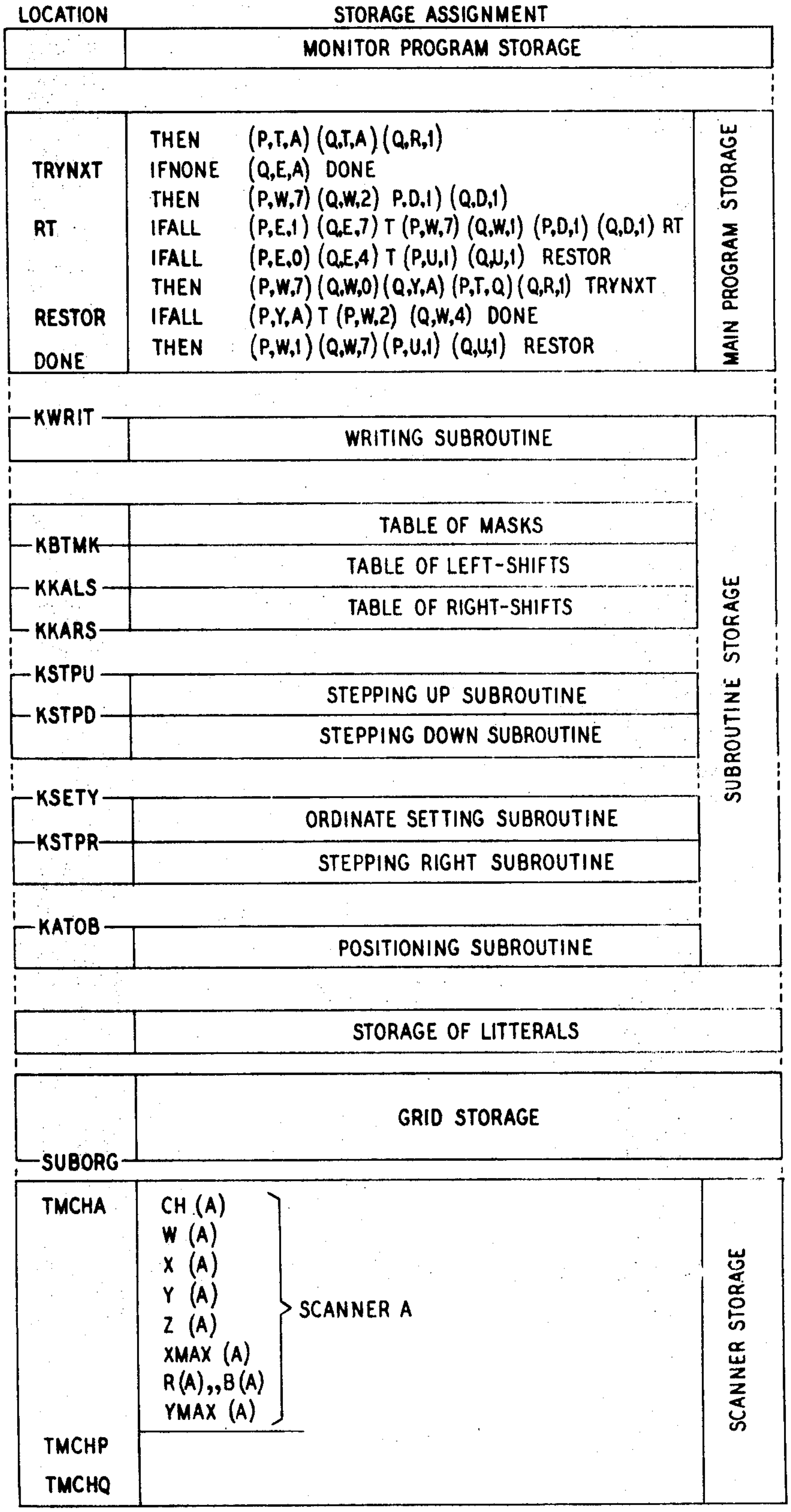
FIG. 3A is a storage diagram for program instructions which bring about the modification is spatially distributed information shown in FIG. 2B.

Considering first the signals stored in the memory 100 of the machine in FIG. 1B, a general storage diagram in set forth in FIG. 3A. The first region of storage is devoted to so-called monitor signals which are used in loading the other stored signals and performing supervisory operations. The supervisory and loading operations have a number of well-known implementations. Monitor storage is followed by the main program section of the memory. The various operations of the main program, and their storage locations, are represented symbolically in FIG. 3A and are discussed in greater detail subsequently.

The main program is followed by sets of signals in the subroutine section of the memory. During processing, transfers and returns are made between the main program and the stored subroutines. The so-called "LITERALS" after the subroutine storage secton are signals which are used during processing when signals directly representing numbers are required.

The LITERALS section of storage is followed by the grid storage for signals corresponding to the spatially distributed information of FIG. 2A. A final section of the memory is devoted to the various scanning registers (herein called "scanners") which are used in exchanging information signals among each other and the grid storage.

Each scanner is a block of eight machine words. The storage associated with a representative scanner, scanner A, is presented in detail in FIG. 3A. The beginning location of the bloc assigned to scanner A is symbolically designated TMCHA. The eight work locations of scanner A successively include:

1. Storage CH(A) for duplicating the character in grid storage which is associated with the scanner A;
2. Storage W(A) for indicating the surface width of the spatially distributed information in machine words;
3. Storage X(A) for indicating the abscissa position of the spatially distributed information associated with the scanner A;
4. Storage Y(A) for indicating the ordinate position of the scanner A;
5. Storage Z(A) for indicating the suborigin of the surface associated with the spatially distributed information. The suborigin is the storage position immediately after the lowermost storage location of the grid storage;
6. Storage XMAX(A) for indicating the maximum abscissa for the spatially distributed information of FIG. 2A;
7. Storage R(A),, B(A) for indicating the machine word, i.e., register, associated with scanner A and the byte number within the machine word. A byte is a subset of binary signals within a machine word. In the example under consideration, the signals of each character constitute a byte and there are twelve bytes per machine word;
8. Storage YMAX(A) for indicating the maximum ordinate for the spatially distributed information of FIG. 2A.

In effect, as the contents of the various locations associated with the scanners are altered, the scanners simulate movement over the surface of the grid of FIG. 2A and exchange signals with other scanners and with the grid.

The signals which initiate the simulated movement of the scanners constitute the main program. These signals, as symbolized in the main program storage of FIG. 3A, include two basic operations —conditional and unconditional.

Each unconditional operation, symbolized by THEN, has associated with it a list of tests which may be terminated by direction to transfer to the signals at some other location of the memory.

Each conditional operation, symbolized by IFXXX—where XXX may be ANY and ALL or their negatives NONE and NALL—has associated with it a list of "texts," followed by a list of "commands" which may also be terminated by a direction to transfer. The separation between tests and commands is symbolized by a "T."

The tests are of the "positions" of the scanners on the grid and of the characters stored in the associated positions. The commands are to "reposition" the scanners with respect to the grid, and to alter the contents stored at the various positions. Each test of a position and each command is symbolized by a triplet, and first letter of which designates the scanner, the second letter designates the type of test or operation, and the third character indicates the quantity involved in the test or operation.

For the purpose of illustrating the invention, the tests are of two kinds. The first kind is used to test the position of the scanner, for example (A,Y,B) which is read "Is A at the ordinate position of B?" and (A,Y,$N_{10}$) which reads "Is A at the ordinate N?". The second kind of test is of the character at the scanner position, for example, (A,E,B) which is read "Is the character associated with the scanner A equal to the character associated with the scanner B?".

The illustrative commands are also of two kinds. The first kind moves the scanners either from one position to another, or a specified amount. The movement of a scanner to the position of another scanner is exemplified by (A,T,B) which is read "Move scanner A to the position of scanner B" and (A,Y,B) which is read "Move scanner A to the Y ordinate position of scanner B." The movement of a scanner a specified amount is exemplified by (A,U,$N_{10}$), which is read "Move scanner A up N units"; (A,D,$N_{10}$), which is read "Move scanner A down N units"; (A,R,$N_{10}$) which is read "Move scanner A to the right N units."

The second kind of command is used to change the information at the location specified by the scanner, for example, (A,W,B) which is read "A write B" for writing signals representing the character B in the location specified by the scanner A; and (A,W,$N_8$) which is read "A write Number" for writing the number $N_8$ at the location of grid storage specified by the scanner A.

The particular operations of the main program which are symbolized in the main program storage section of FIG. 3A act with the signals stored in the subroutine section move to left-hand portion boundary of FIG. 2A adjacent to the first letter of the word "TEXT," as shown in FIG. 2B.

The invention may be adapted to a wide variety of data processing apparatus. When adapted to the IBM 7090, as described in IBM Form 223-6895-2, dated June, 1962, the signals of the main program take the form shown in table II, while the subroutine signals and those of scanner A take the form shown in table III.

Table II

| MEMORY LOCATION (OCTAL) | OCTAL REPRESENTATION OF CONTENTS OF MEMORY LOCATION | SYMBOLIC LOCATION | SYMBOLIC OPERATION & OPERAND |
|---|---|---|---|
| CC451 | | | THEN (P,T,A)(Q,T,A)(Q,R,1) |
| CC451 | -C774 CC 1 7714C | | AXC TMCHA,1 |
| CC452 | -C774 CC 2 7752C | | AXC TMCHP,2 |
| 00453 | CC74 CC 4 COC21 | | TSX KATØ8,4 |
| CC454 | -C774 CC 1 77140 | | AXC TMCHA,1 |
| CC455 | -C774 CC 2 77540 | | AXC TMCHQ,2 |
| C0456 | CC74 CC 4 00021 | | TSX KATØ8,4 |
| CC457 | -C534 CC 1 77546 | | LXD TMCHQ+6,1 |
| CC46C | -C774 CC 2 7754C | | AXC TMCHQ,2 |
| CC461 | CC74 CC 4 CC012 | | TSX KSTPR,4 |
| CC462 | | TRYNXT | IFNØNE (Q,E,4)DØNE |
| 00462 | C5CC CC C 7754C | | CLA TMCHQ |
| C0463 | C4C2 CC C 00746 | | SUB =Ø4 |
| CC464 | C1CC CC C C0466 | | TZE ..010 |
| 00465 | CC2C CC C C0623 | | TRA DØNE |
| CC466 | | | THEN (P,W,7)(Q,W,2) (P,D,1)(Q,D,1) |
| CC466 | -C5C0 CC C C0751 | | CAL =Ø7 |
| C0467 | -C534 CC 1 77526 | | LXD TMCHP+6,1 |
| CC47C | -C774 CC 2 7752C | | AXC TMCHP,2 |
| CC471 | CC74 CC 4 CCOCC | | TSX KWRIT,4 |
| CC472 | -C5CC CC C CC745 | | CAL =Ø2 |
| CC473 | -C534 CC 1 77546 | | LXD TMCHQ+6,1 |
| C0474 | -C774 CC 2 7754C | | AXC TMCHQ,2 |
| CC475 | CC74 CC 4 CCCC0 | | TSX KWRIT,4 |
| CC476 | -C534 CC 1 77526 | | LXD TMCHP+6,1 |
| CC477 | -C774 CC 2 77520 | | AXC TMCHP,2 |
| CC5CC | CC74 CC 4 CC005 | | TSX KSTPD,4 |
| CC5C1 | -C534 CC 1 77546 | | LXD TMCHQ+6,1 |
| C05C2 | -C774 CC 2 7754C | | AXC TMCHC,2 |
| CC5C3 | CC74 CC 4 00005 | | TSX KSTPD,4 |
| CC5C4 | | RT | IFALL (P,E,5)(Q,E,7)T(P,W,7) (Q,W,5)(P,D,1)(Q,D,1)RT |
| CC504 | C5C0 CC C 7752C | | CLA TMCHP |
| CC5C5 | C4C2 CC C CC747 | | SUB =Ø5 |
| CC5C6 | -C1C0 CC 0 CC531 | | TNZ ..012 |
| CC5C7 | C5C0 CC C 7754C | | CLA TMCHQ |
| CC51C | C4C2 CC C 0C751 | | SUB =Ø7 |
| CC511 | -C1C0 CC G 0C531 | | TNZ ..012 |
| CC512 | -C5CC CC C 00751 | | CAL =Ø7 |
| CC513 | -C534 CC 1 77526 | | LXD TMCHP+6,1 |
| C0514 | -0774 CC 2 7752C | | AXC TMCHP,2 |
| C0515 | CC74 CC 4 CCOCC | | TSX KWRIT,4 |
| 00516 | -C5C0 0C C 00747 | | CAL =Ø5 |
| CC517 | -0534 CC 1 77546 | | LXD TMCHQ+6,1 |
| C052C | -0774 CC 2 77540 | | AXC TMCHQ,2 |
| C0521 | CC74 CC 4 C00C0 | | TSX KWRIT,4 |
| C0522 | -C534 CG 1 77526 | | LXD TMCHP+6,1 |
| CC523 | -C774 CC 2 77520 | | AXC TMCHP,2 |
| 00524 | CC74 CC 4 00005 | | TSX KSTPD,4 |
| CC525 | -C534 CC 1 77546 | | LXD TMCHQ+6,1 |
| 00526 | -C774 CC 2 77540 | | AXC TMCHC,2 |
| C0527 | CC74 CC 4 C00C5 | | TSX KSTPD,4 |
| C053C | CC2C CC C CC5C4 | | TRA RT |
| 00531 | | | IFNALL (P.E.0)(Q,E,4)T(P,U,1) (Q,U,1)RESTØR |
| CC531 | C5CC CC C 7752C | | CLA TMCHP |
| 0C532 | C4C2 CC C CC743 | | SUB =Ø0 |
| CC533 | -C1CC CC C CC540 | | TNZ ..016 |
| CC534 | C5CC CC C 7754C | | CLA TMCHQ |
| CC535 | C4C2 CC C C0746 | | SUB =Ø4 |
| CC536 | -C10C CC 0 CC540 | | TNZ ..016 |
| C0537 | CC2C CC C C0547 | | TRA ..017 |
| CC54C | -C534 CC 1 77526 | | LXD TMCHP+6,1 |
| CC541 | -C774 CC 2 7752C | | AXC TMCHP,2 |
| CC542 | CC74 CC 4 CC0C4 | | TSX KSTPU,4 |
| CC543 | -C534 CC 1 77546 | | LXD TMCHQ+6,1 |
| CC544 | -C774 CC 2 7754C | | AXC TMCHQ,2 |
| CC545 | CC74 CC 4 00CC4 | | TSX KSTPU,4 |
| C0546 | CC2C CC C CC570 | | TRA RESTØR |
| CC547 | | | THEN (P,W,7)(Q,W,C)(Q,Y,A) (P,T,Q)(Q,R,1)TRYNXT |
| CC547 | -C5C0 CC C C0751 | | CAL =Ø7 |
| CC55C | -C534 CC 1 77526 | | LXD TMCHP+6,1 |
| CC551 | -C774 CC 2 7752C | | AXC TMCHP,2 |
| CC552 | CC74 CC 4 0C000 | | TSX KWRIT,4 |
| 0C553 | -C5CC CC C CC743 | | CAL =Ø0 |
| CC554 | -C534 CC 1 77546 | | LXD TMCHQ+6,1 |
| C0555 | -C774 CC 2 7754C | | AXC TMCHC,2 |
| CC556 | CC74 CC 4 0C0CC | | TSX KWRIT,4 |
| C0557 | -C5CC CC C 77143 | | CAL TMCHA+3 |
| C056C | CC74 CC 4 CC011 | | TSX KSETY,4 |
| CC561 | -C774 CC 1 7754C | | AXC TMCHC,1 |
| CC562 | -C774 CC 2 7752C | | AXC TMCHP,2 |

Table II—Continued

| MEMORY LOCATION (OCTAL) | OCTAL REPRESENTATION OF CONTENTS OF MEMORY LOCATION | SYMBOLIC LOCATION | SYMBOLIC OPERATION & OPERAND |
|---|---|---|---|
| 0C563 | CC74 CC 4 CCC21 | | TSX KATØ8,4 |
| CC564 | -C534 CC 1 77546 | | LXD TMCHQ+6,1 |
| 00565 | -C774 CC 2 7754C | | AXC TMCHC,2 |
| CC566 | CC74 CC 4 00C12 | | TSX KSTPR,4 |
| CC567 | CC2C CC C CC462 | | TRA TRYNXT |
| CC57C | | RESTØR | IFALL (P,Y,A)T(P,W,2) (Q,W,4)DØNE |
| CC57C | C5CC CC C 77523 | | CLA TMCHP+3 |
| CC571 | C4C2 0C C 77143 | | SUB TMCHA+3 |
| CC572 | -C1C0 CC C CC6C4 | | TNZ ..022 |
| 0C573 | -C5CC CC C CC745 | | CAL =Ø2 |
| CC574 | -C534 CC 1 77526 | | LXD TMCHP+6,1 |
| CC575 | -C774 CC 2 7752C | | AXC TMCHP,2 |
| CC576 | CC74 CC 4 CC00C | | TSX KWRIT,4 |
| CC577 | -C5CC CC C CC746 | | CAL =Ø4 |
| CC60C | -C534 CC 1 77546 | | LXD TMCHC+6,1 |
| C06C1 | -0774 CC 2 7754C | | AXC TMCHQ,2 |
| CC6C2 | CC74 CC 4 CC0CC | | TSX KWRIT,4 |
| C06C3 | CC20 CC 0 CC623 | | TRA DØNE |
| CC6C4 | | | THEN (P,W,5)(Q,W,7)(P,U,1) (Q,U,1)RESTØR |
| C06C4 | -C5CC CC C CC747 | | CAL =Ø5 |
| CC6C5 | -C534 CC 1 77526 | | LXD TMCHP+6,1 |
| 0C6C6 | -C774 CC 2 77520 | | AXC TMCHP,2 |
| CC6C7 | CC74 CC 4 CCCCC | | TSX KWRIT,4 |
| C061C | -C5C0 GC C C0751 | | CAL =Ø7 |
| C0611 | -C534 CC 1 77546 | | LXD TMCHG+6,1 |
| CC612 | -C774 CC 2 77540 | | AXC TMCHQ,2 |
| C0613 | CC74 CC 4 COCOG | | TSX KWRIT,4 |
| CC614 | -C534 CC 1 77526 | | LXD TMCHP+6,1 |
| CC615 | -C774 CC 2 7752C | | AXC TMCHP,2 |
| CC616 | CC74 CC 4 00004 | | TSX KSTPU,4 |
| CC617 | -C534 CC 1 77546 | | LXD TMCHQ+6,1 |
| CC62C | -C774 CC 2 7754C | | AXC TMCHC,2 |
| 00621 | 0C74 CC 4 C0C04 | | TSX KSTPU,4 |
| CC622 | CC20 CC C CC570 | | TRA RESTØR |
| 00623 | | DØNE | |

LITERALS

| | |
|---|---|
| 00743 | 000000000000 |
| 00745 | 000000000002 |
| 00746 | 000000000004 |
| 00747 | 000000000005 |
| 00751 | 000000000007 |

Table III

| MEMORY LOCATION (OCTAL) | OCTAL REPRESENTATION OF CONTENTS OF MEMORY LOCATION | SYMBOLIC LOCATION | SYMBOLIC OPERATION & OPERAND |
|---|---|---|---|
| 00C01 | -032C C0 0 27065 | KWRIT | ANA =Ø7 |
| 00C02 | 06C2 C0 2 0C0CC | | SLW 0,2 |
| C0003 | | | KTSTY |
| 00C07 | 0522 C0 1 0C131 | | XEC KKALS,1 |
| 00C1C | -0602 60 2 0C0C6 | | ØRS* 6,2 |
| 00011 | -05C1 C0 1 0C114 | | ØRA KBTMK,1 |
| 00C12 | 032C 60 2 0CCC6 | | ANS* 6,2 |
| 00C13 | 0020 C0 4 CC0C1 | | TRA 1,4 |
| 00100 | -377777777770 | | ØCT 777777777770 |
| 00101 | -377777777707 | | ØCT 777777777707 |
| 00102 | -377777777077 | | ØCT 777777777077 |
| 00103 | -377777770777 | | ØCT 777777770777 |
| 00104 | -377777707777 | | ØCT 777777707777 |
| 00105 | -377777077777 | | ØCT 777777077777 |
| 00106 | -377770777777 | | ØCT 777770777777 |
| 00107 | -377707777777 | | ØCT 777707777777 |
| 00110 | -377077777777 | | ØCT 777077777777 |
| 00111 | -370777777777 | | ØCT 770777777777 |
| 00112 | -307777777777 | | ØCT 707777777777 |
| 00113 | +077777777777 | | ØCT 077777777777 |
| 00114 | 0 CCCC0 0 0C0CC | KBTMK | PZE 0 |
| 00115 | 0761 00 C 0C0C0 | | NØP |
| 00116 | 0767 C0 C 0C0C3 | | ALS 3 |
| 00117 | 0767 C0 C 0C0C6 | | ALS 6 |
| 00120 | 0767 C0 0 0C011 | | ALS 9 |
| C0121 | 0767 C0 C 0C014 | | ALS 12 |
| 00122 | 0767 C0 0 0C017 | | ALS 15 |
| 00123 | 0767 C0 C 0C022 | | ALS 18 |
| 00124 | 0767 C0 C 0C025 | | ALS 21 |
| C0125 | 0767 C0 C 0C03C | | ALS 24 |
| 00126 | 0767 C0 0 0C033 | | ALS 27 |
| 00127 | 0767 C0 C 0C036 | | ALS 30 |
| 00130 | 0767 C0 C 0C041 | | ALS 33 |
| 00131 | 0 00CC0 0 000C0 | KKALS | PZE 0 |
| 00132 | 0771 C0 C 0C0CC | | ARS 0 |
| 00133 | 0771 C0 0 0C0C3 | | ARS 3 |
| 00134 | 0771 C0 0 0C0C6 | | ARS 6 |
| 00135 | 0771 C0 C 0C011 | | ARS 9 |
| 00136 | 0771 C0 0 0C014 | | ARS 12 |
| 00137 | 0771 C0 C 0C017 | | ARS 15 |
| 0014C | 0771 C0 0 00022 | | ARS 18 |
| 00141 | 0771 C0 0 00025 | | ARS 21 |
| 00142 | 0771 00 C 0C030 | | ARS 24 |
| 00143 | 0771 00 0 00033 | | ARS 27 |
| 00144 | 0771 00 0 0C036 | | ARS 30 |
| 00145 | 0771 C0 C CC041 | | ARS 33 |
| 00146 | 0771 00 0 0C044 | KKARS | ARS 36 |
| 00165 | 0500 CC 2 0C0C3 | KSTPU | CLA 3,2 |
| 00166 | 0400 00 0 27057 | | ACD =1 |
| 00167 | 0621 C0 2 000C3 | | STA 3,2 |
| 0017C | 05CC C0 2 0C0C6 | | CLA 6,2 |
| 00171 | 0402 C0 2 0C0C1 | | SUB 1,2 |

Table III – Continued

| MEMORY LOCATION (OCTAL) | OCTAL REPRESENTATION OF CONTENTS OF MEMORY LOCATION | SYMBOLIC LOCATION | SYMBOLIC OPERATION & OPERAND |
|---|---|---|---|
| 00172 | 0621 C0 2 0C0C6 | | STA 6,2 |
| 00173 | 0500 60 2 00006 | | CAL* 6,2 |
| 00174 | 0522 00 1 00146 | | XEC KKARS,1 |
| 00175 | 0320 00 0 27065 | | ANA =Ø7 |
| 00176 | 0602 00 2 00000 | | SLW 0.2 |
| 00177 | 002C C0 4 0CCC1 | | TRA 1,4 |
| 0020C | 0500 00 2 0C0C3 | KSTPC | CLA 3,2 |
| 00201 | 0400 C0 C 27172 | | ADD =Ø77777 |
| 00202 | 0621 C0 2 0C0C3 | | STA 3,2 |
| 00203 | 0500 C0 2 0C0C6 | | CLA 6,2 |
| 00204 | 04C0 C0 2 000C1 | | ADD 1,2 |
| 00205 | 0621 C0 2 0C0C6 | | STA 6,2 |
| 00206 | 0500 60 2 00006 | | CAL* 6,2 |
| 00207 | 0522 00 1 00146 | | XEC KKARS,1 |
| 00210 | 0320 00 0 27065 | | ANA =Ø7 |
| 00211 | 0602 00 2 00000 | | SLW 0,2 |
| 00212 | 0020 00 4 00001 | | TRA 1.4 |
| 00274 | 0621 C0 2 0CCC3 | KSETY | STA 3,2 |
| 00275 | 04C0 C0 C 27057 | | ACD =1 |
| 00276 | 0131 C0 C 000CC | | XCA |
| 00277 | 0200 00 2 0C0C1 | | MPY 1,2 |
| 00300 | 0131 C0 0 000C0 | | XCA |
| C0301 | 076C C0 C 000C6 | | CØM |
| 00302 | 04CC C0 0 27057 | | ACD =1 |
| 00303 | C400 C0 2 000C4 | | ACD 4,2 |
| 00304 | 0621 C0 2 0C0C6 | | STA 6,2 |
| 00305 | 05CC C0 C 27056 | | CLA =0 |
| 00306 | 0560 C0 2 0C0C2 | | LCQ 2,2 |
| 00307 | 0221 C0 C 27072 | | DVP =12 |
| C0310 | C131 C0 C 0C0CC | | XCA |
| 00311 | 04C0 CC 2 000C6 | | ACD 6,2 |
| 00312 | 0601 C0 2 000C6 | | STØ 6.2 |
| 00313 | 0500 60 2 00006 | | CAL* 6,2 |
| 00314 | 0522 00 1 00146 | | XEC KKARS,1 |
| 00315 | 0320 00 0 27065 | | ANA =Ø7 |
| 00316 | 0602 00 2 00000 | | SLW 0,2 |
| 00317 | 0C2C C0 4 000C1 | | TRA 1,4 |
| 00320 | -3 00C13 1 0C335 | KSTPR | TXL KSTPS,1,11 |
| 00321 | 0534 C0 1 27057 | | LXA =1,1 |
| 00322 | -050C C0 2 0CCC6 | | CAL 6,2 |
| 00323 | 04C2 C0 C 27176 | | SUB =Ø12777777 |
| 00324 | 0602 C0 2 000C6 | | SLW 6,2 |
| 0C325 | 050C C0 2 0C0C2 | | CLA 2,2 |
| 00326 | 04C2 C0 2 0C0C5 | | SUB 5,2 |
| 00327 | -01CC C0 C 0C34C | | TNZ KSTPS+3 |
| 00330 | 0600 C0 2 0C0C2 | | STZ 2,2 |
| 00331 | -05CC C0 2 0C0C3 | | CAL 3,2 |
| 00332 | C4CC C0 C 27172 | | ACD =Ø77777 |
| 00333 | 0621 C0 2 000C3 | | STA 3,2 |
| 00334 | 002C C0 C 00343 | | TRA KSTPS+6 |
| 00335 | 1 0CCC1 1 0C336 | KSTPS | TXI *+1,1,1 |
| 00336 | -0754 C0 1 0C0C0 | | PXD 0,1 |
| 00337 | 0622 C0 2 0C0C6 | | STD 6,2 |
| 0034C | 05CC C0 2 0C0C2 | | CLA 2,2 |
| 00341 | 04CC C0 0 27057 | | ACD =1 |
| 0C342 | 0601 C0 2 000C2 | | STØ 2,2 |
| 00343 | 0500 60 2 00006 | | CAL* 6,2 |
| 00344 | 0522 00 1 00146 | | XEC KKARS,1 |
| 00345 | 0320 00 0 27065 | | ANA =Ø7 |
| 00346 | 0602 00 2 00000 | | SLW 0,2 |
| 00347 | 0020 00 4 00001 | | TRA 1.4 |
| 00652 | 05CC C0 1 CCCC1 | KATØB | CLA 1,1 |
| 00653 | 0601 C0 2 0C0C1 | | STØ 1,2 |
| 00654 | 050C C0 1 0C0C2 | | CLA 2,1 |
| 0C655 | 06C1 C0 2 0C0C2 | | STØ 2,2 |
| 00656 | 0500 C0 1 0C0C3 | | CLA 3,1 |
| 00657 | 0601 C0 2 0C0C3 | | STØ 3,2 |
| 00660 | 05CC C0 1 0C0C4 | | CLA 4,1 |
| 0C661 | 06C1 C0 2 0C0C4 | | STØ 4,2 |
| 00662 | 0500 C0 1 0C0C5 | | CLA 5,1 |
| 00663 | 0601 C0 2 0C0C5 | | STØ 5,2 |
| 00664 | 05C0 C0 1 0C0C7 | | CLA 7,1 |
| 00665 | 06C1 C0 2 0C0C7 | | STØ 7,2 |
| 00666 | 050C 00 1 CC0C6 | | CLA 6,1 |
| C0667 | 0601 C0 2 0C0C6 | | STØ 6,2 |
| 0067C | -0734 C0 1 0CCCC | | PCX 0,1 |
| 00671 | C621 C0 0 0C672 | | STA *+1 |
| C0672 | -05CC C0 C CC0C0 | | CAL ** |
| 00673 | 0522 C0 1 0C146 | | XEC KKARS,1 |
| 0C674 | -C32C C0 C 27065 | | ANA =Ø7 |
| 00675 | 0601 C0 2 0C0C0 | | STØ 0,2 |
| C0676 | 002C C0 4 0C0C1 | | TRA 1,4 |

LITERALS

| | | | |
|---|---|---|---|
| 27057 | 000000000001 | | |
| 27065 | 000000000007 | | |
| 27067 | 000000000011 | | |
| 27070 | 000000000012 | | |
| 27172 | 000000077777 | | |
| 77140 | 0 00000 0 00002 | TMCHA | PZE CH(A) |
| | 0 00000 0 00013 | | PZE W(A) |
| | 0 00000 0 00017 | | PZE X(A) |
| | 0 00000 0 00103 | | PZE Y(A) |
| | 0 00000 0 46644 | | PZE Z(A) |
| | 0 00000 0 00203 | | PZE XMAX(A) |
| | 0 00004 0 45271 | | PZE R(A),O,B(A) |
| 77147 | 0 00000 0 00133 | | PZE YMAX(A) |
| 77520 | | TMCHP | PZE CH(P) |
| | | | PZE YMAX(P) |
| 77540 | | TMCHQ | PZE CH(Q) |
| | | | PZE YMAX(Q) |

Figure 3B:
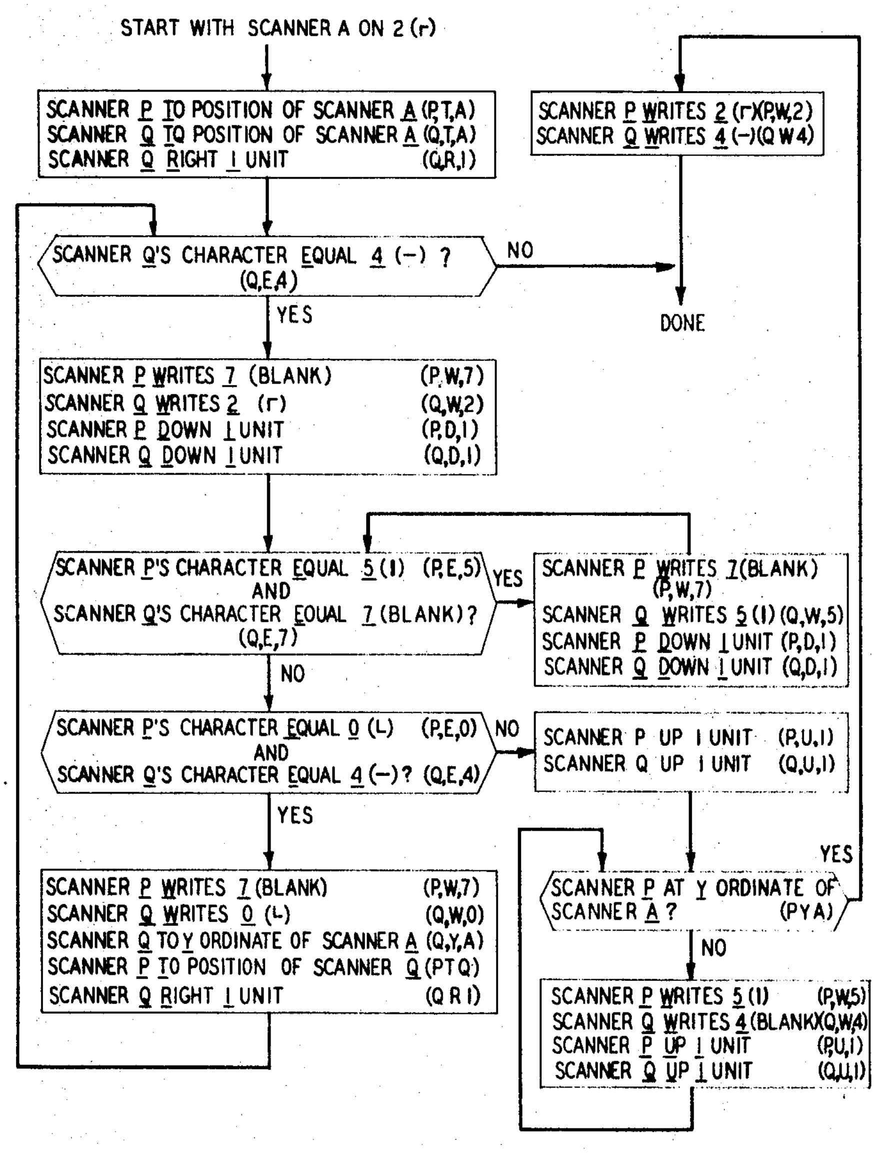
FIG. 3B is a flow chart of a representative set of operations in accordance with the invention.
Figure 3C:
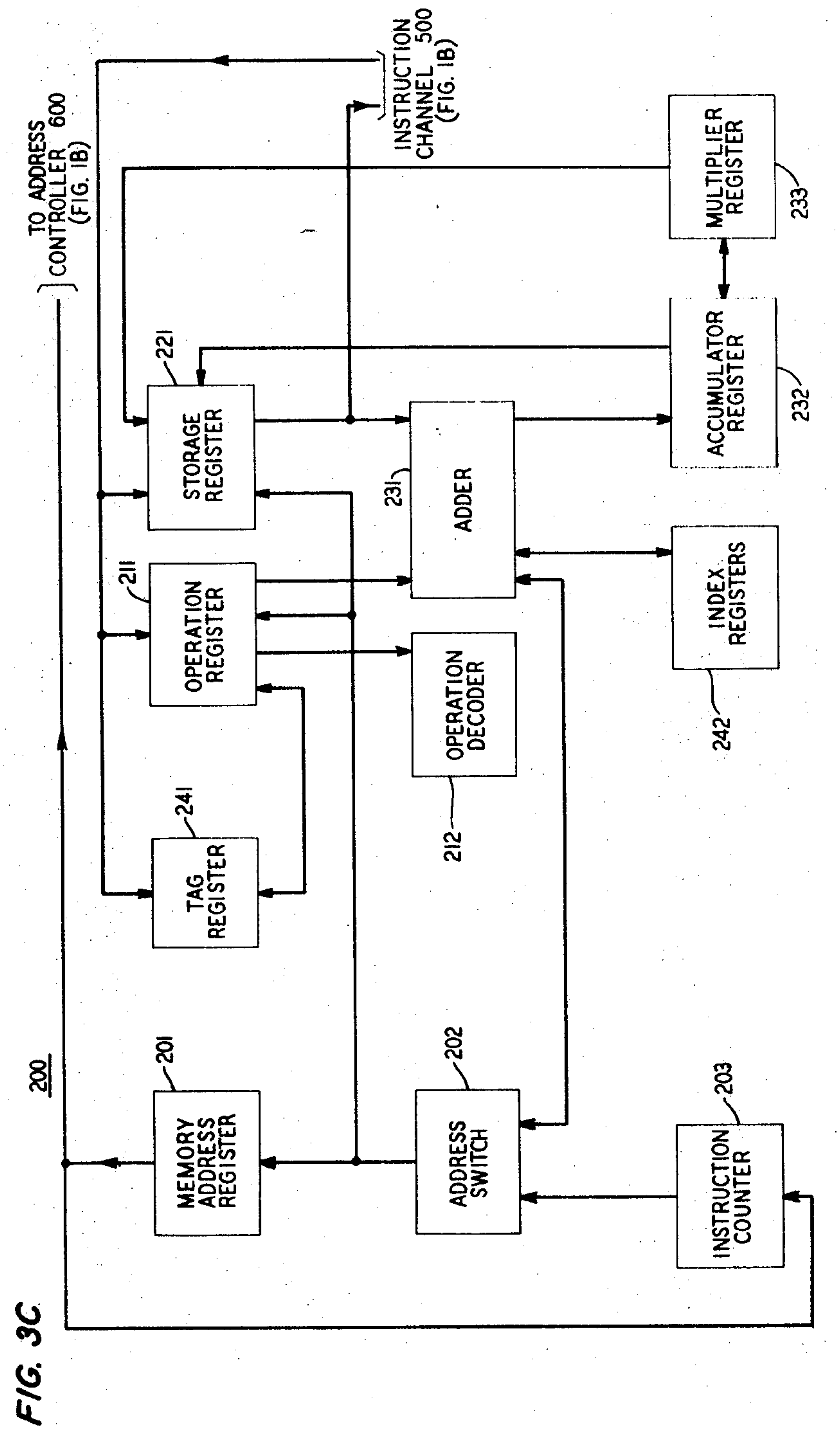
FIG. 3C is a block diagram of a processing unit such as unit 200 in FIG. 1B which is employed in practicing the invention.

The signals of tables II and III, in the case, of the IBM 7090, act upon the processing unit 200 of FIG. 1B, which includes, in broad outline, the components set forth in FIG. 3C. Among the included components are 201, 202, and 203 which are used in addressing the machine memory; components 211 and 212 which are used for registering and decoding the various machine operations; component 221 which is used in storing machine words dispatched to, and extracted from, the machine memory; components 231, 232, and 233 which are used in performing arithmetic operations; and components 241 and 242 which are used in indexing. A more detailed discussion of the components and of their various operations during processing is to be found in IBM U.S. Pat. No. 3,036,773, issued May 29, 1962 to J. L. Brown.

The entries of tables II and III are collectively known as listings. Each listing is divided into a right-hand section containing the symbolic locations and representations of machine instructions, and a left-hand section with their machine instructions, and a left-hand section with their machine signal counterparts in octal notation. For example, the first instruction of table II for which there is machine coding is given symbolically as AXC TMCHA,1. The octal form of the machine signal counterparts of the various portions of this instruction are −774, which is associated with the operation AXC, and 77140, which is associated with the address portion TMCHA of the operand. The numerical designation which follows TMCHA refers to index register number 1. This designation is carried directly to the sixth digit position (from the right) of the machine word. The octal number in the first column of the listings indicates that the AXC instruction is stored at location 451 of the memory 100.

When the signals representing the location 451 appear at the output of the address register 201 of FIG. 3C, the machine word −0774 00 1 77140 is extracted from the memory 100 of FIG. 1B. Each octal digit represents the signals of three binary digits, each of which is called a "bit." Bits 18 through 20 of the seventh octal digit (from the left) enter the tag register 241 of FIG. 3C. This is followed by the entry of bits 18 through 35 of octal digits 7 through 12 into the storage register 221. The address portion goes into the adder 231 and then to the register number 1 which is included among index registers 242. This is followed by the operation of deriving the two's complement of the address location now stored in index register 1, so that the ultimate contents of that register are signals representing the complemented address of the AXC instruction. The modes of operation of the other individual instructions of tables II and III are explained in detail in the IBM Form mentioned above.

It is to be understood that the various memory locations shown in tables II and III are derived from an "assembly" and are relocated in conventional fashion to be understood that the main program of FIG. 3A merely illustrates several representative operations in accordance with the invention and is but a portion of an overall main program for carrying out still other operations.

Before the machine instruction of the main program at memory location 451 of table II is executed, scanner A at memory location 77140 (before relocation) has been set, as shown at the end of table III, either manually or by earlier portions of the main program (not shown). The first group of coding in table II, at memory locations 451–461, prefaced by the unconditional operation THEN, sets the scanners P and Q with the preset machine signals of scanner A. This setting operation is symbolized as (P,T,A) and (Q,T,A). It includes a transfer to the KATOB subroutine and the execution of machine instruction at memory locations 652–676 of table III. In addition, the Q scanner is stepped to the right by one unit (Q,R,I) by a transfer to the KSTPR subroutine at locations 320–334 of table III.

A flow chart which summarizes various operations of the main program is shown in FIG. 3B. Each block in FIG. 3B corresponds to a block of coding in table II, the uppermost block corresponding to the block of coding discussed above. The succeeding blocks of FIG. 3B produce various transfers to the other subroutines of table III with the ultimate result that by the time the processing has reached location 623 of table II, the illustrative portion of the processing is completed and the system is ready for further assignments in accordance with the invention.

Briefly, the operations which are summarized in FIG. 3B begin with scanner A, in effect, on the upper left-hand corner of the boundary shown in FIG. 2A. Scanner P is then moved to the position of A and scanner Q is placed one square to the right. Scanners P and Q then sweep downward with Q copying and P erasing the contents of the squares swept by it. The downward sweep terminates when the lower left-hand corner of the boundary is encountered at which time P and Q are moved upward to the level of scanner A and the downward sweep is repeated. This procedure continues until scanner Q encounters neither a lower bound nor a blank, at which point the scanning sweep is reversed to restore what had been erased during the downward sweep.

The contents of the grid storage of FIG. 3A, both before and after scanning manipulation, may be read out of the memory 100 of FIG. 1B and used to expose a photographic plate according to the nature of the signals stored at the various grid locations. For the grid of FIG. 2A, where seven different characters are employed, the various characters may represent any one of seven levels of intensity.

Other adaptations of the invention will occur to those skilled in the art.

I claim:

1. A method for processing digital signals representing graphical information which is to be visually displayed, said method comprising the steps of 1. reserving a portion of a word-addressable memory for an array of data items, each data item representing a graphical element in a rectangular array f graphical elements,
2. storing the coordinate position of a specific graphical element in said rectangular array,
3. accessing a particular data item representing said specific graphical element by utilizing said coordinate position,
4. comparing the data item representing said specific graphical element with a preselected data item, and
5. arithmetically altering said coordinate position to provide access to a data item representing another graphical element in a different coordinate position in said rectangular array.

2. The method according to claim 1 further comprising the step of comparing the coordinate position of said specific graphical element with a given coordinate position.

3. The method according to claim 1 further comprising the step of storing accessing, comparing and altering commands in the internal memory of a general purpose digital computer.